US012663812B2

(12) United States Patent
Zhu

(10) Patent No.: US 12,663,812 B2
(45) Date of Patent: Jun. 23, 2026

(54) DYNAMIC EDGE PATH GENERATION METHOD, COMPUTER DEVICE, AND STORAGE MEDIUM

(71) Applicant: SHENZHEN PUDU TECHNOLOGY CO., LTD., Shenzhen (CN)

(72) Inventor: Jilin Zhu, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 62 days.

(21) Appl. No.: 18/835,184

(22) PCT Filed: Apr. 23, 2023

(86) PCT No.: PCT/CN2023/089999
§ 371 (c)(1),
(2) Date: Aug. 1, 2024

(87) PCT Pub. No.: WO2023/231640
PCT Pub. Date: Dec. 7, 2023

(65) Prior Publication Data
US 2025/0138553 A1      May 1, 2025

(30) Foreign Application Priority Data

May 31, 2022    (CN) .......................... 202210606138.0

(51) Int. Cl.
*G05D 1/648*          (2024.01)
*A47L 11/40*          (2006.01)
(Continued)

(52) U.S. Cl.
CPC ........ *G05D 1/6484* (2024.01); *A47L 11/4011* (2013.01); *G05D 1/246* (2024.01); (Continued)

(58) Field of Classification Search
CPC .......................... A47L 11/4011; G05D 1/0289; G05D 1/0217; G05D 1/648; B60W 30/12; G01S 13/88; G01C 21/30; G06V 10/764
See application file for complete search history.

(56) References Cited

U.S. PATENT DOCUMENTS 6,064,926 A * 5/2000 Sarangapani ........ G05D 1/0289
701/414
2009/0084173 A1* 4/2009 Gudat ..................... G01S 13/88
73/146
(Continued)

FOREIGN PATENT DOCUMENTS

CN          105184852 A  * 12/2015  ........... G06V 10/764
CN          107462243 A  * 12/2017  ............. G01C 21/30
(Continued)

OTHER PUBLICATIONS

Caijing et al., "A Research on Local Path Planning for Autonomous Vehicles Based on Improved APF Method", Automotive Engineering, vol. 35, No. 9, 2013, 4 pages.
(Continued)

*Primary Examiner* — Yuri Kan
(74) *Attorney, Agent, or Firm* — OPENPTO US LLC; Yuhao Liang

(57) ABSTRACT

A dynamic edge path generation method includes: obtaining a static edge path; obtaining dynamic sensing information in real time, the dynamic sensing information comprising a device position and an obstacle edge; cutting out a preset length of path segment from the static edge path on the basis of the device position, and fitting path points contained in the path segment to obtain a fitted curve; determining, on the basis of the fitted curve and the obstacle edge, a moving direction corresponding to each fitted sampling point in the fitted curve; moving each fitted sampling point by a preset distance at least once on the basis of the corresponding
(Continued)

moving direction so as to obtain each corresponding target path point; and obtaining a dynamic edge path on the basis of the target path points.

18 Claims, 9 Drawing Sheets

(51) Int. Cl.

| | | |
|---|---|---|
| *G05D 1/246* | (2024.01) |
| *G05D 1/622* | (2024.01) |
| *G05D 1/644* | (2024.01) |
| *G05D 105/10* | (2024.01) |
| *G05D 107/40* | (2024.01) |

(52) U.S. Cl.
CPC ............. *G05D 1/622* (2024.01); *G05D 1/644* (2024.01); *A47L 2201/04* (2013.01); *G05D 2105/10* (2024.01); *G05D 2107/40* (2024.01)

(56) References Cited

U.S. PATENT DOCUMENTS

| | | | | |
|---|---|---|---|---|
| 2019/0204839 A1* | 7/2019 | Sunil Kumar | ........ | B60W 30/12 |
| 2022/0050468 A1* | 2/2022 | Artes | .................. | A47L 11/4011 |
| 2022/0136837 A1* | 5/2022 | Neeschal | ............. | G05D 1/0217 |
| | | | | 701/410 |

FOREIGN PATENT DOCUMENTS

| | | |
|---|---|---|
| CN | 109683619 A | 4/2019 |
| CN | 111474946 A | 7/2020 |
| CN | 111938513 A | 11/2020 |
| CN | 112180931 A | 1/2021 |
| CN | 113721608 A | 11/2021 |
| CN | 110928320 A | 3/2022 |
| CN | 114253267 A | 3/2022 |
| CN | 114396945 A | 4/2022 |
| JP | 2008077670 A | 4/2008 |
| JP | 2012173786 A | 9/2012 |
| JP | 2014115924 A | 6/2014 |
| JP | 2017211734 A | 11/2017 |
| WO | WO 2019/069524 A1 | 4/2019 |
| WO | WO 2021/248845 A | 12/2021 |

OTHER PUBLICATIONS

Decision of Grant received in corresponding Application No. CN 202210606138.0, dated May 9, 2024, 3 pages.

Office Action received in corresponding Application No. CN 202210606138.0, dated Feb. 23, 2024, 7 pages.

International Search Report and Written Opinion (with English translation) received in corresponding Application No. PCT/CN2023/089999, dated Aug. 22, 2023, 13 pages.

Decision to Grant (with English translation) received in corresponding Application No. JP 2024543589, dated Jul. 1, 2025, 6 pages.

Extended European Search Report received in corresponding Application No. EP 23814826.6, dated Apr. 2, 2025, 11 pages.

Elmokadem, "Real-time Safe Navigation Strategy for Mobile Robots in 3D: A Deforming Path Approach", Chinese Control Conference, Jul. 27-30, 2019, Guangzhou, China, 6 pages.

* cited by examiner

102

104

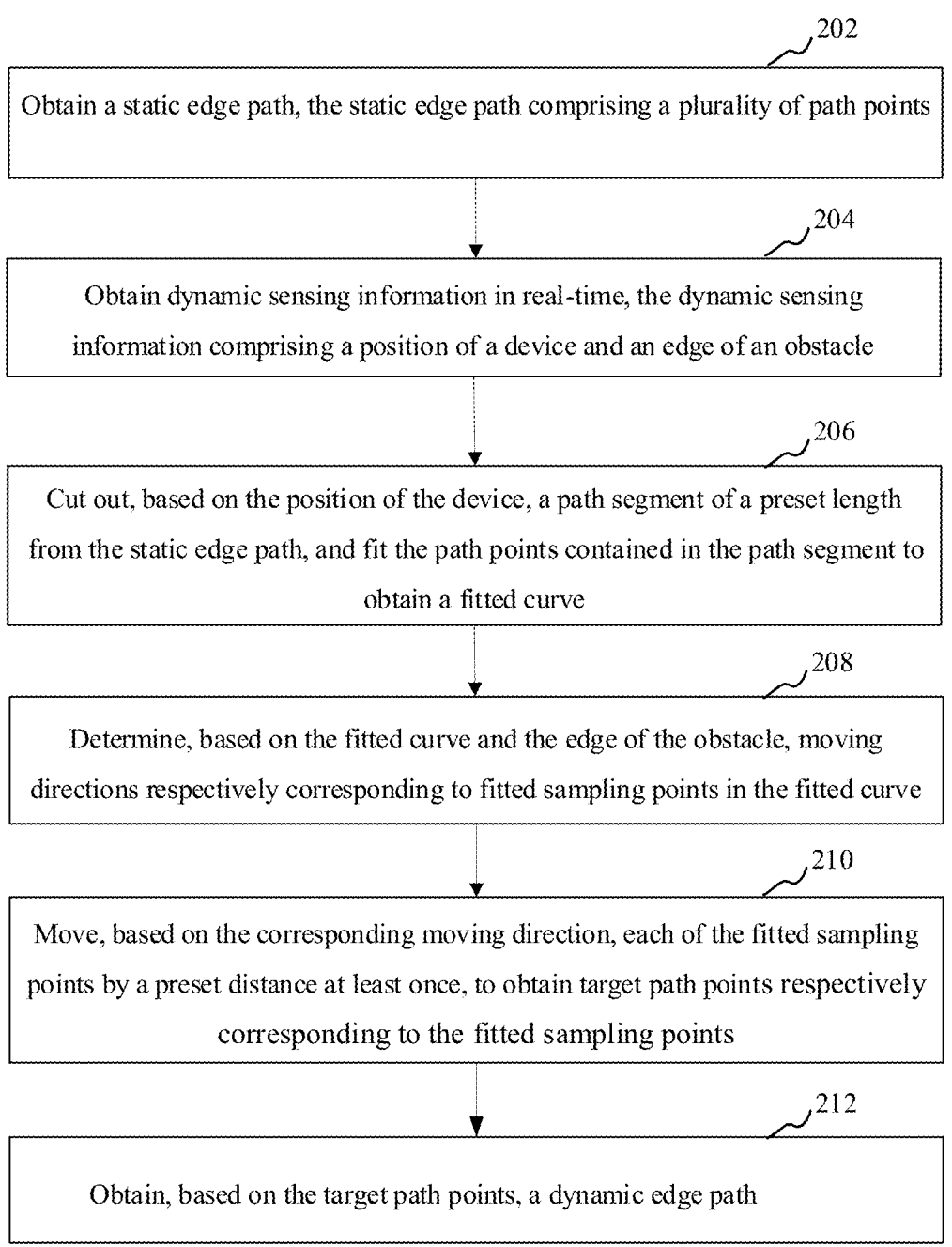

Obtain a static edge path, the static edge path comprising a plurality of path points _202_

Obtain dynamic sensing information in real-time, the dynamic sensing information comprising a position of a device and an edge of an obstacle _204_

Cut out, based on the position of the device, a path segment of a preset length from the static edge path, and fit the path points contained in the path segment to obtain a fitted curve _206_

Determine, based on the fitted curve and the edge of the obstacle, moving directions respectively corresponding to fitted sampling points in the fitted curve _208_

Move, based on the corresponding moving direction, each of the fitted sampling points by a preset distance at least once, to obtain target path points respectively corresponding to the fitted sampling points _210_

Obtain, based on the target path points, a dynamic edge path _212_

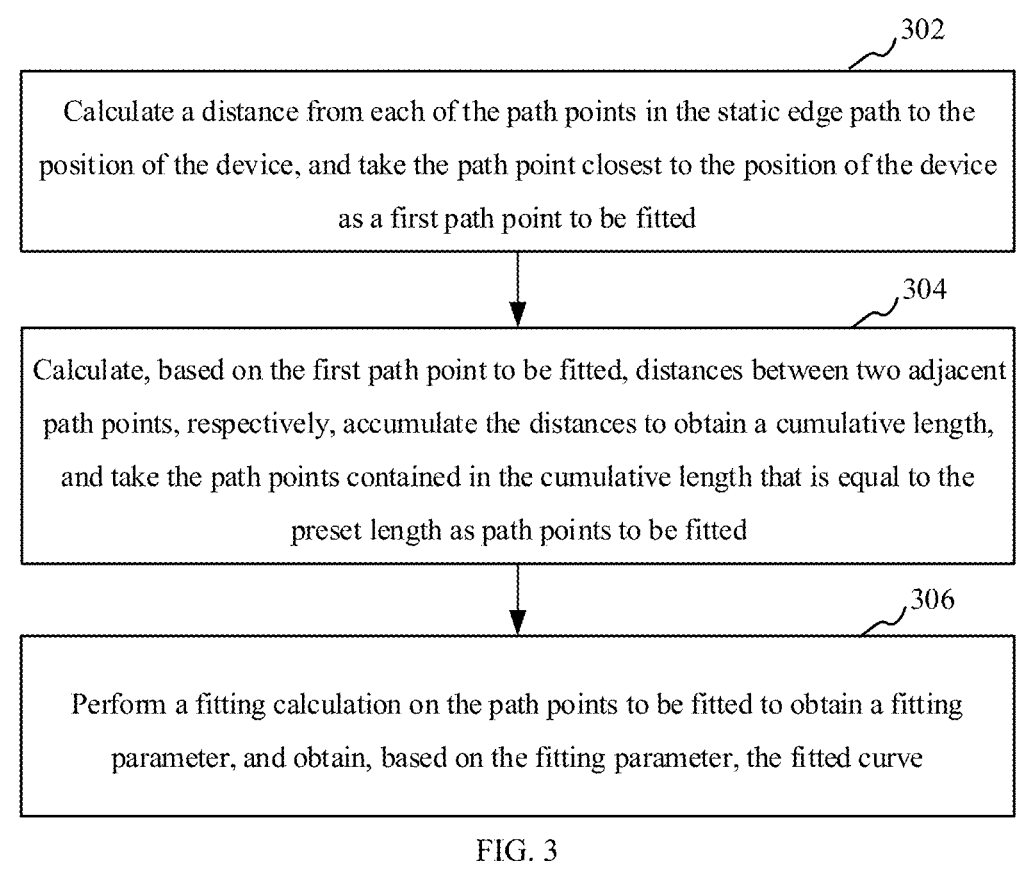

Calculate a distance from each of the path points in the static edge path to the position of the device, and take the path point closest to the position of the device as a first path point to be fitted

304

Calculate, based on the first path point to be fitted, distances between two adjacent path points, respectively, accumulate the distances to obtain a cumulative length, and take the path points contained in the cumulative length that is equal to the preset length as path points to be fitted

306

Perform a fitting calculation on the path points to be fitted to obtain a fitting parameter, and obtain, based on the fitting parameter, the fitted curve

FIG. 3

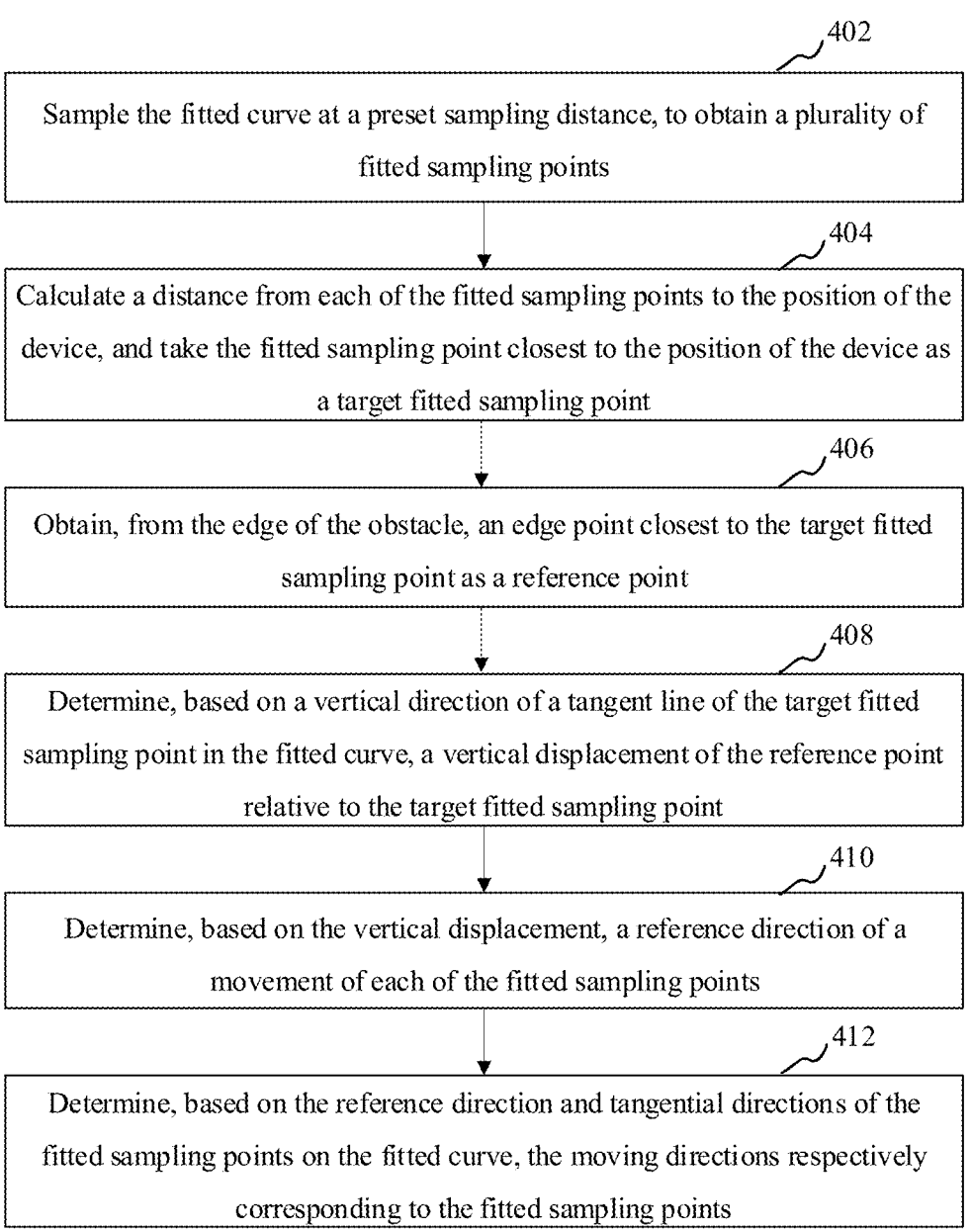

Sample the fitted curve at a preset sampling distance, to obtain a plurality of fitted sampling points
~402

Calculate a distance from each of the fitted sampling points to the position of the device, and take the fitted sampling point closest to the position of the device as a target fitted sampling point
~404

Obtain, from the edge of the obstacle, an edge point closest to the target fitted sampling point as a reference point
~406

Determine, based on a vertical direction of a tangent line of the target fitted sampling point in the fitted curve, a vertical displacement of the reference point relative to the target fitted sampling point
~408

Determine, based on the vertical displacement, a reference direction of a movement of each of the fitted sampling points
~410

Determine, based on the reference direction and tangential directions of the fitted sampling points on the fitted curve, the moving directions respectively corresponding to the fitted sampling points
~412

FIG. 4

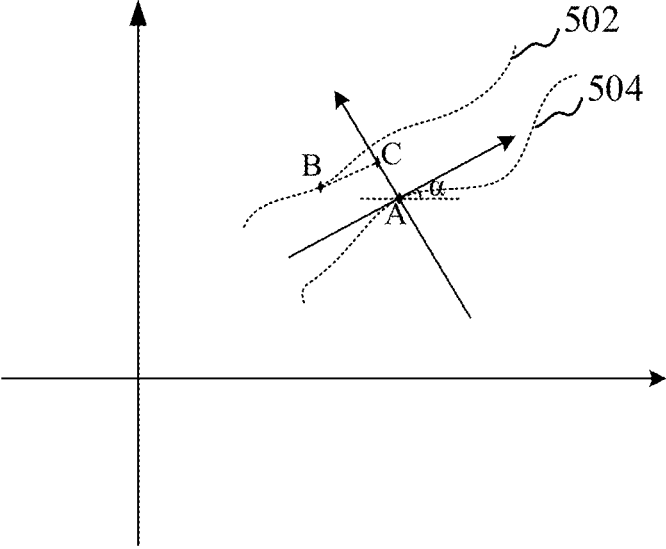

FIG. 5

| 602 |
| --- |
| Determine, based on the fitted curve, the tangential directions of the fitted sampling points on the fitted curve through a direction operation, respectively |

| 604 |
| --- |
| Fuse the tangential direction of each of the fitted sampling points on the fitted curve with the reference direction, to obtain the moving direction corresponding to each of the fitted sampling points |

FIG. 6

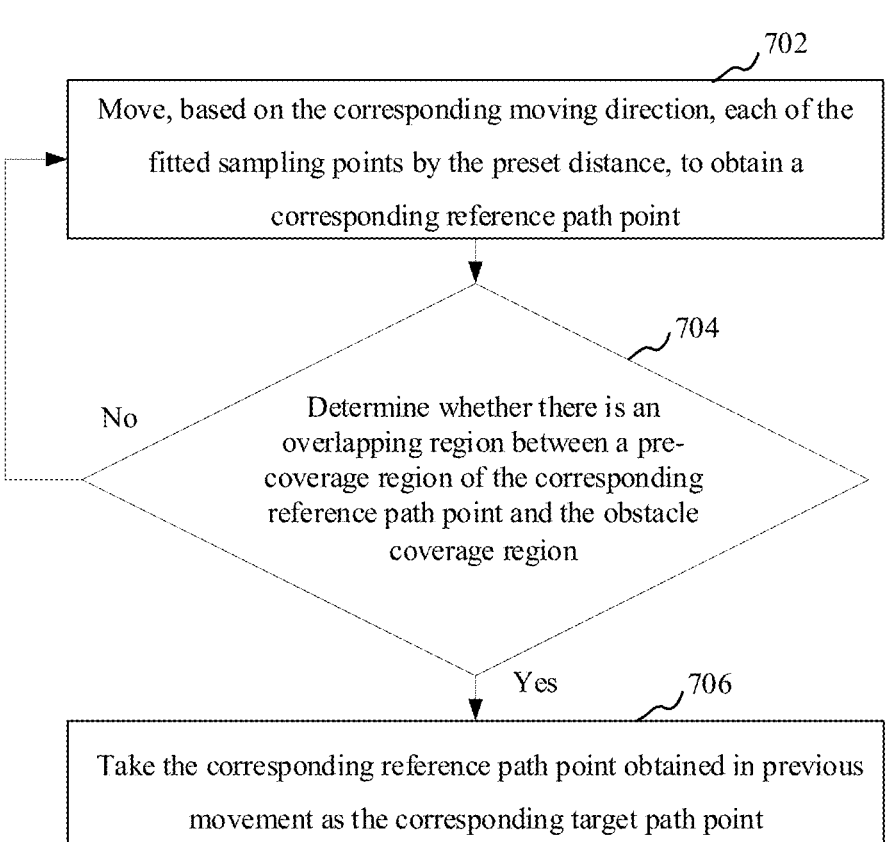

702

Move, based on the corresponding moving direction, each of the fitted sampling points by the preset distance, to obtain a corresponding reference path point

704

Determine whether there is an overlapping region between a pre-coverage region of the corresponding reference path point and the obstacle coverage region No Yes

706

Take the corresponding reference path point obtained in previous movement as the corresponding target path point

Obtain an initial map of an operation region

804

Perform a dilation process and an erosion process on the initial map, to obtain a target image

806

Obtain, based on the target image, the static edge path

| Obtain an initial map of an operation region |

904

| Process the initial map to obtain a static edge path |

906

| Perform a cleaning operation based on the static edge path, and obtain dynamic sensing information in real time |

908

| Adjust the static edge path based on the dynamic sensing information, to obtain a dynamic edge path |

910

| Perform the cleaning operation based on the dynamic edge path |

FIG. 9

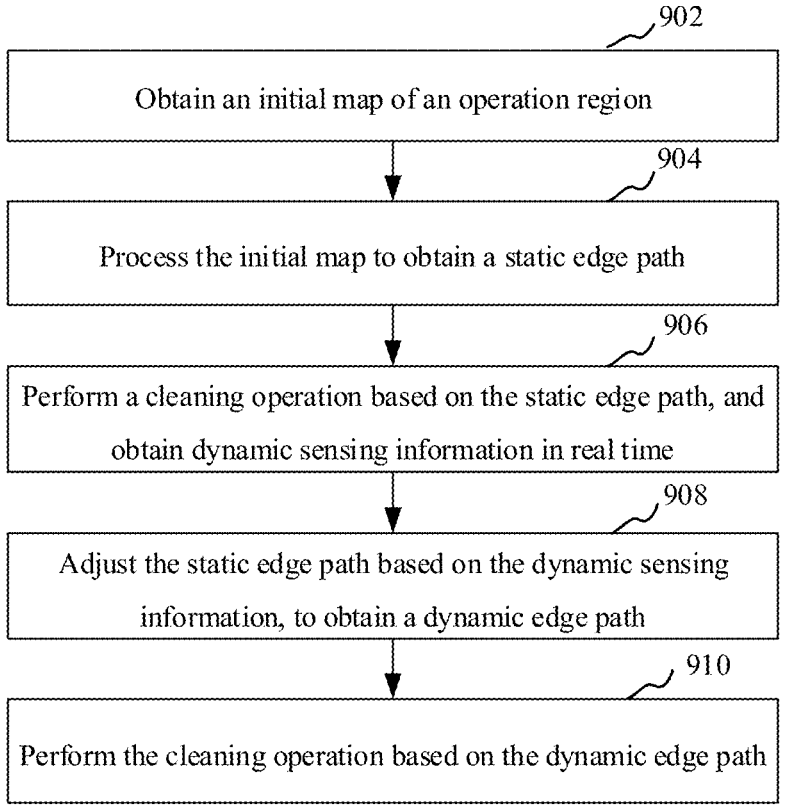

FIG. 10A

DYNAMIC EDGE PATH GENERATION METHOD, COMPUTER DEVICE, AND STORAGE MEDIUM

CROSS-REFERENCE TO RELATED APPLICATIONS

The present application is the national phase under 35 U.S.C. § 371 of PCT international application No. PCT/CN2023/089999, which has an international filing date of Apr. 23, 2023 and claims priority to Chinese patent application No. 2022106061380, titled "DYNAMIC EDGE PATH GENERATION METHOD AND APPARATUS, COMPUTER DEVICE, AND STORAGE MEDIUM", filed with the China National Intellectual Property Administration on May 31, 2022. The contents of the above identified PCT international application and Chinese patent application are incorporated herein in their entireties by reference for all purposes.

TECHNICAL FIELD

The present disclosure relates to the field of artificial intelligence, and in particular, to a dynamic edge path generation method, a computer device, and a storage medium.

BACKGROUND

With the rise of artificial intelligence technologies, automated devices are applied in various industries, such as cleaning, patrolling, mine clearance, harvesting, etc. The automated device in the above industries needs to perform full coverage operations according to an operation path, and an edge operation is a very important indicator to measure the working effectiveness of the automated device.

In conventional art, the automated device performs related work according to a planned edge path, and cannot cope with complex scenarios or scenarios with large environmental changes.

SUMMARY

According to various embodiments of the present disclosure, a dynamic edge path generation method and apparatus, a computer device, and a storage medium are provided.

A dynamic edge path generation method is provided, including:

obtaining a static edge path, the static edge path including a plurality of path points;

obtaining dynamic sensing information in real-time, the dynamic sensing information including a position of a device and an edge of an obstacle;

cutting out, based on the position of the device, a path segment of a preset length from the static edge path, and fitting the path points contained in the path segment to obtain a fitted curve;

determining, based on the fitted curve and the edge of the obstacle, moving directions respectively corresponding to fitted sampling points in the fitted curve;

moving, based on the corresponding moving direction, each of the fitted sampling points by a preset distance at least once, to obtain target path points respectively corresponding to the fitted sampling points; and obtaining, based on the target path points, a dynamic edge path.

A dynamic edge path generation apparatus is also provided, including:

a static edge path obtaining module configured to obtain a static edge path, the static edge path including a plurality of path points;

a dynamic sensing information obtaining module configured to obtain dynamic sensing information in real-time, the dynamic sensing information including a position of a device and an edge of an obstacle;

a fitting module configured to cut out, based on the position of the device, a path segment of a preset length from the static edge path, and fit the path points contained in the path segment to obtain a fitted curve;

a moving direction determination module configured to determine, based on the fitted curve and the edge of the obstacle, moving directions respectively corresponding to fitted sampling points in the fitted curve;

a moving module configured to move, based on the corresponding moving direction, each of the fitted sampling points by a preset distance at least once, to obtain target path points respectively corresponding to the fitted sampling points; and a dynamic edge path generation module configured to obtain, based on the target path points, a dynamic edge path.

A computer device is further provided. The computer device includes a processor and a memory having a computer program stored therein. The processor, when executing the computer program, implements steps of the above dynamic edge path generation method.

A computer-readable storage medium having a computer program stored therein is further provided. When the computer program is executed by a processor, steps of the above dynamic edge path generation method are implemented.

A computer program product including a computer program is further provided. When the computer program is executed by a processor, steps of the above dynamic edge path generation method are implemented.

One or more embodiments of the present disclosure will be described in detail below with reference to drawings. Other features, objects and advantages of the present disclosure will become more apparent from the description, drawings, and claims.

BRIEF DESCRIPTION OF THE DRAWINGS

In order to describe the technical solutions of the embodiments of the present disclosure or the conventional art more clearly, the accompanying drawings required for describing the embodiments or for describing the conventional art will be briefly introduced as follows. Apparently, the accompanying drawings, in the following description, illustrate merely some embodiments of the present disclosure, for a person of ordinary skill in the art, drawings of other embodiments can also be obtained according to these accompanying drawings without making any creative efforts.

FIG. 2 is a flow diagram illustrating a dynamic edge path generation method in an embodiment.

FIG. 3 is a flow diagram illustrating a method for generating a fitted path in an embodiment.

FIG. 4 is a flow diagram illustrating a method for determining a moving direction in an embodiment.

FIG. 5 is a schematic diagram illustrating a vertical displacement in an embodiment.

FIG. 6 is a flow diagram illustrating a method for determining a moving direction in another embodiment.

FIG. 7 is a flow diagram illustrating a method for determining a target path point in an embodiment.

FIG. 8 is a flow diagram illustrating a method for determining a static edge path in an embodiment.

FIG. 9 is a flow diagram illustrating a method for a sweeping robot to obtain a dynamic edge path in an embodiment.

FIG. 10A is a schematic diagram illustrating an initial map in an embodiment.

DETAILED DESCRIPTION OF THE EMBODIMENTS

In order to facilitate understanding of the present disclosure, the present disclosure will be described more fully below with reference to the relevant accompanying drawings. Preferred embodiments of the present disclosure are presented in the accompanying drawings. However, the present disclosure may be implemented in many different forms and is not limited to the embodiments described herein. Rather, these embodiments are provided for the purpose of making the understanding of present disclosure more thorough and comprehensive.

Unless otherwise defined, all technical and scientific terms used herein have the same meaning as commonly understood by those skilled in the technical field to which the present disclosure belongs. The terms used herein in the specification of the application are for the purpose of describing specific embodiments only, and are not intended to limit the application. The term "and/or" as used herein includes any and all combinations of one or more of the relevant listed items.

Figure 1:
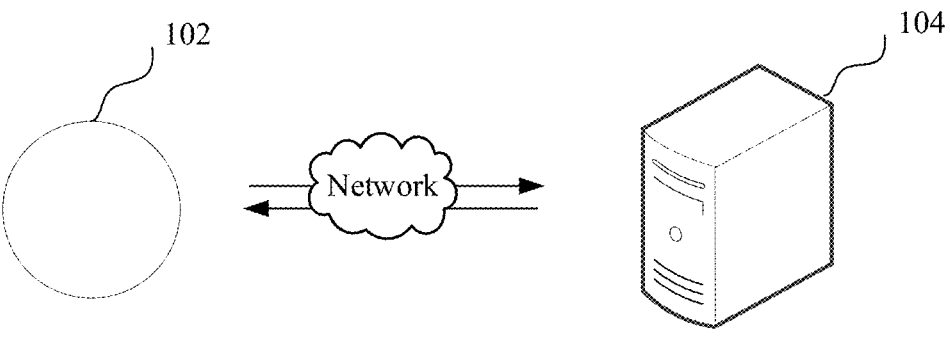
FIG. 1 is a diagram illustrating an application environment of a dynamic edge path generation method in an embodiment.

A dynamic edge path generation method provided in an embodiment of the present disclosure can be applied in an application environment shown in FIG. 1. A device 102 communicates with a server 104 via a network. A data storage system can store data that the server 104 needs to process. The data storage system may be integrated on the server 104, or placed on a cloud or other network servers. The device 102 obtains a static edge path from the server 104, and the device 102 performs operations according to the static edge path and sends dynamic sensing information obtained in real-time to the server 104. The server 104 obtains the dynamic sensing information, cuts out a path segment of a preset length from the static edge path based on a position of a device, and fits the path points contained in the path segment to obtain a fitted curve. Then the server 104 determines moving direction respectively corresponding to fitted sampling points in the fitted curve based on the fitted curve and an edge of an obstacle, moves each of the fitted sampling points by a preset distance at least once based on the corresponding moving direction to obtain target path points respectively corresponding to the fitted sampling points, and obtains a dynamic edge path based on the target path points. The device 102 obtains the dynamic edge path from the server 104, and performs operations according to the dynamic edge path. The device 102 may be, but is not limited to, at least one of various automated devices, a sweeping robot, a robot, an autonomous vehicle, or an unmanned aircraft. The server 104 may be implemented as an independent server or a server cluster consisting of multiple servers.

In an embodiment, as shown in FIG. 2, a dynamic edge path generation method is provided. This embodiment takes the method applied to a device as an example for illustration. It is understandable that the method can also be applied to a server, and can also be applied to a system including a device and a server, and can be implemented through an interaction between the device and the server. In this embodiment, the method includes the following steps.

In step 202, a static edge path is obtained. The static edge path includes a plurality of path points.

The path refers to an open or closed road for the device to pass through. The static edge path refers to a road close to an edge of an obstacle, which is generated based on a static map. The path points refers to a collection of points that make up the path. The path point can be represented by unique two-dimensional or three-dimensional coordinates.

Exemplarily, the device obtains the static edge path for an operation region, and the static edge path includes the plurality of path points.

In an embodiment, the device obtains an initial map of the operation region, processes the initial map and extracts contours, and determines a maximum contour as the static edge path. The initial map may be a feature map, a topological map, a grid map, or the like. The processing method may be one of image processing methods such as binarization processing, dilation processing, erosion processing, etc., or a combination of multiple processing methods.

In step 204, dynamic sensing information is obtained in real-time. The dynamic sensing information includes a position of a device and an edge of an obstacle.

Real-time means doing something at the same time when something happens or develops. The dynamic sensing information refers to the information related to the device itself and related to an operation environment obtained while the device is operating. The position of the device refers to a specific location of the device in the operation region, which can be represented by two-dimensional or three-dimensional coordinates. The obstacle refers to facilities or objects that hinder the operation of the device, such as walls, tables, or other devices.

Exemplarily, the device obtains the position of the device and obstacle information through an auxiliary device. In an embodiment, the auxiliary device includes an ultrasonic sensor, an infrared distance measurement instrument or the like.

In an embodiment, the position of the device is represented by two-dimensional coordinates of a geometric center point of the device in the operation region. The obstacle information includes the edge of the obstacle and an obstacle coverage region. The edge of the obstacle and the obstacle coverage region are each represented by a point set of two-dimensional coordinate points. A point set of the edge of the obstacle is a subset of an obstacle coverage region point set.

In step 206, a path segment of a preset length is cut out from the static edge path based on the device position, and the path points contained in the path segment are fitted to obtain a fitted curve.

The preset length refers to a length set in advance. The preset length can be set based on user input information, a size of the device, an operation speed of the device, a length of the static edge path, etc. The fitted curve refers to a straight line or curve obtained by fitting a polynomial to a plurality of discrete points.

Exemplarily, the device determines a starting point for cutting out the path segment according to the position of the device, cuts out the path segment of the preset length from the static edge path based on the starting point, and then performs polynomial fitting on the path points contained in the path segment to obtain the fitted curve.

In step 208, moving directions respectively corresponding to fitted sampling points in the fitted curve are determined based on the fitted curve and the edge of the obstacle.

The edge of the obstacle refers to the portion of the obstacle along the edge. The edge of the obstacle can be represented by a curve, a two-dimensional coordinate point set, or the like.

Exemplarily, the device determines the moving directions respectively corresponding to the fitted sampling points based on a positional relationship between the fitted curve and the edge of the obstacle, and tangential directions of the fitted sampling points on the fitted curve.

In step 210, each of the fitted sampling points is moved by a preset distance at least once based on the corresponding moving direction, to obtain target path points respectively corresponding to the fitted sampling points.

The preset distance refers to a distance set in advance. The preset distance can be set according to a moving speed of the device, a shape of the device, a size of the device, a distance between the edge of the obstacle and the device, etc. The target path point refers to the corresponding point that satisfies a set condition after the fitted sampling point moves.

Exemplarily, for each of the fitted sampling points, the device moves multiple times by the preset distance according to the moving direction corresponding to the fitted sampling point until the set condition is satisfied, to obtain the target path point.

In step 212, a dynamic edge path is obtained based on the target path points.

The dynamic edge path refers to an edge path obtained by adjusting the static edge path based on the dynamic sensing information.

Exemplarily, the device connects adjacent path points by using straight lines, and combines the target path point and the straight lines between the adjacent path points into the dynamic edge path.

In the above dynamic edge path generation method, the dynamic sensing information is obtained in real time, the path segment of the preset length is cut out from the static edge path based on the position of the device, and then each of the fitted sampling points obtained by sampling the path segment is fitted to obtain the fitted curve. Further, the moving directions respectively corresponding to the fitted sampling points in the fitted curve are determined based on the fitted curve and the edge of the obstacle, and each of the fitted sampling points is moved by the preset distance at least once based on the corresponding moving direction to obtain the target path points respectively corresponding to the fitted sampling points. Further, the dynamic edge path is obtained based on the target path points, and the static edge path is adjusted in real time based on the obtained dynamic sensing information, which can not only avoid obstacles, but also make the obtained dynamic edge path more closely fit the edge of the obstacle, solving the problem of edge operation of the device in complex scenarios or scenarios with large environmental changes.

In an embodiment, as shown in FIG. 3, the step 206 includes the following steps.

In step 302, a distance from each of the path points in the static edge path to the position of the device is calculated, and the path point closest to the position of the device is taken as a first path point to be fitted.

The first path point to be fitted refers to a first path point selected from the path points in the static edge path for obtaining the fitted curve.

Exemplarily, the device calculates the distances from the path points in the static edge path to the position of the device respectively, and compares the distances to determine the shortest distance. Then the path point corresponding to the shortest distance is taken as the first path point to be fitted. The distance from the path point to the position of the device can be calculated using the following formula (1):

$$L_i = \sqrt{(x_i - x)^2 + (y_i - y)^2} \qquad \text{Formula (1)}$$

where $L_i$ refers to a distance from the $i^{th}$ path point to the position of the device, $x_i$ refers to a horizontal coordinate of the $i^{th}$ path point in an operation map, $y_i$ refers to a vertical coordinate of the $i^{th}$ path point in the operation map, x refers to a horizontal coordinate of a geometric center of the device in the operation map, and y refers to a vertical coordinate of the geometric center of the device in the operation map.

In step 304, distances between two adjacent path points are calculated based on the first path point to be fitted, respectively, the distances are accumulated to obtain a cumulative length, and the path points contained in the cumulative length that is equal to the preset length is taken as path points to be fitted.

Exemplarily, the device calculates the distances between two adjacent path points starting from the first path point to be fitted, respectively, and accumulates the calculated distances to obtain the cumulative length, and then takes the path points contained in the cumulative length that is equal to the preset distance as the path points to be fitted.

In step 306, a fitting calculation is performed on the path points to be fitted to obtain a fitting parameter, and the fitted curve is obtained based on the fitting parameter.

Fitting means representing a series of points on a plane with a smooth curve. The fitting includes linear fitting, polynomial fitting, exponential fitting, Gaussian fitting, etc. The fitting parameter refers to the parameter of the expression of the fitted curve. The fitting parameter can be solved by the least square method, experimental data fitting method or other methods. The fitted curve refers to a mathematical model established for multiple discrete points. The fitted curve may be an exponential function fitted curve, a power function fitted curve, a hyperbolic fitted curve, or the like.

In an embodiment, a trinomial fitting is performed on the path points to be fitted. First, a cubic polynomial is represented as $f(x)=a+b*x+c*x^2+d*x^3$, a set of the path points to be fitted is represented as $P=((x_1, y_1), (x_2, y_2), \ldots, (x_m, y_n))$, and a parameter matrix to be solved is represented as $\text{Para}=[a\ b\ c\ d]^T$. Then a nonlinear least squares method is used to solve the parameters, and the solution expression is represented as:

$$\underset{Para}{\arg\min} \sum_{i=0}^{n} (f(x_i) - y_i)^2 \qquad \text{Formula (2)}$$

where $x_i$ and $y_i$ refer to horizontal and vertical coordinates of the $i^{th}$ fitted path point in the operation region. The formula (2) can be solved by the Newton-Gauss iterative method, or by using the solution method in the solver G2O optimization library or Ceres optimization library. Ceres refers to a tool used to solve nonlinear least squares problems in Google's open source nonlinear optimization library Ceres Solver. G2O refers to general graphic optimization, which is an image optimization library that combines nonlinear optimization with graph theory. G2O can be used to solve any least squares problem that can be expressed as a graph optimization.

In this embodiment, the selected path points are fitted to obtain the corresponding fitted curve, which provides a basis for determining fitted sampling points and moving directions of the fitted sampling points, thereby improving the accuracy of calculating the moving directions of the fitted sampling points.

In an embodiment, as shown in FIG. 4, the step 208 includes the following steps.

In step 402, the fitted curve is sampled at a preset sampling distance, to obtain a plurality of fitted sampling points.

The preset sampling distance refers to a preset spacing distance between sampling points. The preset sampling distance can be set according to the computing capability of the server, a size, a shape, or an operating speed of the device, etc. The fitted sampling points refer to the points sampled on the fitted curve, and can be represented by coordinate points.

Exemplarily, the device samples the fitted curve multiple times, and a sampling spacing distance is the preset sampling distance. Then the plurality of fitted sampling points are obtained.

In step 404, a distance from each of the fitted sampling points to the position of the device is calculated, and the fitted sampling point closest to the position of the device is taken as a target fitted sampling point.

In step 406, an edge point closest to the target fitted sampling point is obtained from the edge of the obstacle as a reference point.

The edge point refers to a point in a set of the edge points of the obstacle, and can be represented by a two-dimensional coordinate point or a three-dimensional coordinate point.

Exemplarily, the device calculates distances from the edge points of the edge of the obstacle to the target fitted sampling point, respectively, and compares the distances to determine the edge point with the shortest distance as the reference point.

In step 408, a vertical displacement of the reference point relative to the target fitted sampling point is determined based on a vertical direction of a tangent line of the target fitted sampling point in the fitted curve.

In an embodiment, as shown in FIG. 5, a set of the edge points of the obstacle is indicated by 502, a set of the fitted sampling points is indicated by 504, the target fitted sampling point is represented by a point A, and the reference point is represented by a point B. The vertical displacement of the point B relative to the point A can be represented as a projection of a vertical axis of the point B on a plane coordinate system established with the point A as an origin and a tangent line of the point A on the fitted curve as a horizontal axis. The vertical displacement of the point B relative to the point A can be understood as a vertical coordinate of a point C, and the vertical displacement S is obtained by the following expression:

$$S = (y_B - y_A) * \cos\alpha - (x_B - x_A) * \sin\alpha \qquad \text{Formula (3)}$$

where $x_B$ and $y_B$ refer to the horizontal and vertical coordinates of the point B, respectively, $x_A$ and $y_A$ refer to the horizontal and vertical coordinates of the point A, respectively, and a refers to a direction angle corresponding to a slope of the tangent line at point A on the fitted curve.

In step 410, a reference direction of a movement of each of the fitted sampling points is determined based on the vertical displacement.

Exemplarily, the device determines whether the edge of the obstacle is in a positive or negative direction of the fitted sampling point based on a positive or negative value of the vertical displacement. It can be understood that if S>0, the edge of the obstacle is in a region of y>0 of the coordinate system established with the point A as the origin and the tangent line of the point A on the fitted curve as the horizontal axis, i.e., the edge of the obstacle is in the positive direction of the fitted sampling point. If S<0, the edge of the obstacle is in a region of y<0 of the coordinate system established with the point A as the origin and the tangent line of the point A on the fitted curve as the horizontal axis, i.e., the edge of the obstacle is in the negative direction of the fitted sampling point.

In step 412, the moving directions respectively corresponding to the fitted sampling points are determined based on the reference direction and tangential directions of the fitted sampling points on the fitted curve.

In this embodiment, the reference direction of the movement of the fitted sampling point is obtained by calculation, and the movement direction corresponding to each of the fitted sampling points is determined based on the reference direction and the tangential direction of each of the fitted sampling points on the fitted curve, thereby improving the directionality for adjusting the static edge path.

In an embodiment, the step 412 includes: determining, if the vertical displacement is greater than zero, the reference direction of 90 degrees; and determining, if the vertical displacement is less than zero, the reference direction of negative 90 degrees.

Exemplarily, if S>0, the reference point in the edge of the obstacle is in the region of y>0 of the coordinate system established with the target fitted point as the origin and the tangent line of the target fitted point on the fitted curve as the horizontal axis. It can be understood that the fitted sampling point moves toward the positive direction of the vertical axis of the above coordinate system, so the reference direction is 90 degrees. If S<0, the reference point in the edge of the obstacle is in the region of y<0 of the coordinate system established with the target fitted point as the origin and the tangent line of the target fitted point on the fitted curve as the horizontal axis. It can be understood that the fitted sampling point moves toward the negative direction of the vertical axis of the above coordinate system, so the reference direction is negative 90 degrees. The direction of the movement is a direction close to the edge of the obstacle.

In this embodiment, the vertical displacement is converted into a quantifiable angle, so as to facilitate the determination of the moving directions respectively corresponding to the fitted sampling points based on the reference direction.

In an embodiment, as shown in FIG. 6, the step 208 includes the following steps.

In step 602, the tangential directions of the fitted sampling points on the fitted curve are determined based on the fitted curve through a direction operation, respectively.

The direction operation refers to a derivation operation and an inverse tangent operation performed on the fitted curve.

In an embodiment, as shown in FIG. 5, the tangential direction of the fitted sampling point A is a, represented as follows:

$$\alpha = \tan^{-1}\left(df(x_A)/dx_A\right) \qquad \text{Formula (4)}$$

where f(x) refers to the fitted curve, and $x_A$ refers to the horizontal coordinate of the fitted sampling point A.

In step 604, the tangential directions of the fitted sampling points on the fitted curve are fused with the reference direction, to obtain the moving directions respectively corresponding to the fitted sampling points.

The moving direction refers to an angle at which each of the fitted sampling points moves toward the edge of the obstacle. Fusion refers to an addition operation.

Exemplarily, for each of the fitted sampling points, the device adds the tangential direction of the fitted sampling point to the reference direction to obtain the moving direction corresponding to the fitted sampling point. It can be understood that the moving direction is equal to the tangential direction plus the reference direction. In an embodiment, as shown in FIG. 5, the moving direction of the fitted sampling point A is α+90°.

In this embodiment, the tangential direction of each of the fitted sampling points is obtained by the direction operation, and then the tangential direction of each of the fitted sampling points is added to the reference direction to obtain the corresponding moving direction of each of the fitted sampling points. The quantized moving direction improves the accuracy for adjusting the static edge path.

In an embodiment, as shown in FIG. 7, the step 210 includes the following steps:

In step 702, each of the fitted sampling points is moved by the preset distance based on the corresponding moving direction, to obtain a corresponding reference path point.

The reference path point refers to a path point obtained by performing one or more translations of the fitted sampling point based on the corresponding moving direction.

In step 704, it is determined whether there is an overlapping region between a pre-coverage region of the corresponding reference path point and the obstacle coverage region.

The pre-coverage region refers to a region determined based on the reference path point and a coverage region of the device, which can be understood as the region covered by the device with the reference path point as the geometric center of the device. The pre-coverage region can be represented by a two-dimensional point set or a three-dimensional point set. The obstacle coverage region refers to a region occupied by the obstacle in the operation region, which can be represented by a two-dimensional coordinate point set or a three-dimensional coordinate point set.

Exemplarily, the device obtains the pre-coverage region based on the reference path point and the size of the device, and performs an intersection operation on the pre-coverage region and the obstacle coverage region. Then it is determined whether the pre-coverage region overlaps with the obstacle coverage region based on an intersection result. If the pre-coverage region does not overlap with the obstacle coverage region, step 702 is executed. If the pre-coverage region overlaps with the obstacle coverage region, step 706 is executed.

In an embodiment, the coordinates of the fitted sampling point in the fitted curve are $(x_i, y_i)$, the corresponding direction angle is α, the reference direction is β (β is 90° or)–90°, the preset moving distance is L, and then the reference path point after the fitted path point moves once based on the moving direction and the preset moving distance is $(x_{i1}, y_{i1})$, $x_{i1}$ and $y_{i1}$ are represented as, respectively:

$$x_{i1} = x_i + L * \cos(\alpha + \beta) \qquad \text{Formula (5)}$$

$$y_{i1} = y_i + L * \sin(\alpha + \beta) \qquad \text{Formula (6)}$$

where $x_{i1}$ and $y_{i1}$ refer to the horizontal and vertical coordinates of the reference path point after the fitted sampling point $(x_i, y_i)$ moves once.

In an embodiment, the device is in a quadrilateral, the coordinates of the four vertices of the device at the reference path point are represented as $\text{vertex}_{11}$, $\text{vertex}_{12}$, $\text{vertex}_{13}$, $\text{vertex}_{14}$, respectively, the coverage region of the device at the reference path point is represented as $H_1$=h ($\text{vertex}_{11}$, $\text{vertex}_{12}$, $\text{vertex}_{13}$, $\text{vertex}_{14}$), and the point set of the coverage region of the obstacle is H, then:

$H_1 \cap H \neq \emptyset$, indicates that a part of the pre-coverage region of the device at the reference path point exists within the obstacle coverage region; and $H_1 \cap H = \emptyset$, indicates that there is no overlapping region between the pre-coverage region of the device at the reference path point and the obstacle coverage region.

In step 706, the corresponding reference path point obtained in the previous movement is taken as the corresponding target path point.

Exemplarily, if the device determines that there is an overlapping region between the pre-coverage region and the obstacle coverage region, indicating that the device cannot pass through the reference path point, and then the reference path point obtained in the previous movement is taken as the target path point.

In this embodiment, the target path point is obtained by moving the fitted sampling point once or multiple times. The obtained target path point is closer to the edge of the obstacle, and allows the device to pass through, reducing the distance between the dynamic edge path and the edge of the obstacle.

In an embodiment, step 704 further includes:

obtaining a size of the device; and obtaining, based on the reference path point and the size, the pre-coverage region where a geometric center of the device is located at the reference path point.

The size refers to a parameter that indicates the dimensions of the device. For example, if the device is a circular shape, the size includes a radius or a diameter, and if the device is a rectangular shape, the size includes a length and a height.

Exemplarily, the device obtains the size of the device, and takes the reference path point as a center and the size as a coverage range to obtain the pre-coverage region corresponding to the reference path point.

In this embodiment, based on the size of the device and the reference path point, the pre-coverage region where the geometric center of the device is located at the reference path point is obtained. The pre-coverage region accurately indicates the coverage region of the device when the device moves to the reference path point.

In an embodiment, the step 704 includes:

obtaining the pre-coverage region of the reference path point, the pre-coverage region being represented by a two-dimensional coordinate point set; obtaining the obstacle coverage region, the obstacle coverage region being represented by a two-dimensional coordinate point set; performing an intersection operation on the two-dimensional coordinate point set of the pre-coverage region and the two-dimensional coordinate point set of the obstacle coverage region, to obtain an intersection result; and determining, if the intersection result is an empty set, that the pre-coverage region does not overlap with the obstacle coverage region.

Exemplarily, when the pre-coverage region and the obstacle coverage region are each represented by the two-dimensional coordinate point set, the intersection operation is performed on the two-dimensional coordinate point set of the pre-coverage region and the two-dimensional coordinate point set of the obstacle coverage region, to obtain the intersection result. If the intersection result is the empty set, it is determined that the pre-coverage region does not overlap with the obstacle coverage region. If the intersection result is not the empty set, it is determined that the pre-coverage region overlaps with the obstacle coverage region.

In this embodiment, based on the intersection result between the two-dimensional coordinate point set of the pre-coverage region and the two-dimensional coordinate point set of the obstacle covered region, it can be accurately determined whether there is an overlap between the pre-coverage region and the obstacle covered region.

In an embodiment, as shown in FIG. 8, obtaining the static edge path includes the following steps.

In step 802, an initial map of an operation region is obtained.

The initial map refers to a map of the operating region obtained by the device through a sensor or an infrared distance measurement instrument. The initial map may be a topological map, a geometric map, a grid map, or the like.

In step 804, a dilation process and an erosion process are performed on the initial map, to obtain a target image.

The dilation process refers to adding pixel values at edges of an image, so that the overall pixel values expand, thereby achieving a dilation effect of the image. The erosion process refers to removing certain parts of the edges of the image to achieve an effect of shrinking the image inward. The erosion processing method includes horizontal erosion, vertical erosion, and omnidirectional erosion.

In step 806, the static edge path is obtained based on the target image.

Contour extraction refers to extracting the edges of the image. The contour extraction method may include an internal hollowing point extraction method, a boundary tracking method, a region growing method, a region splitting and merging method, and the like.

Exemplarily, the device obtains a contour of the image by applying a contour extraction method to the target image, and uses the largest contour as the static edge path.

In this embodiment, the device obtains the initial map of the operating region, and performs the dilation process and erosion process on the initial map to obtain the target map. Then the contour extraction is performed on the target map to obtain the static edge path, thereby obtaining a path for the device to operate close to the edge of the obstacle.

In an exemplary embodiment, the device is a sweeping robot. The process of the sweeping robot obtaining a dynamic edge path is shown in FIG. 9.

Figure 10B:
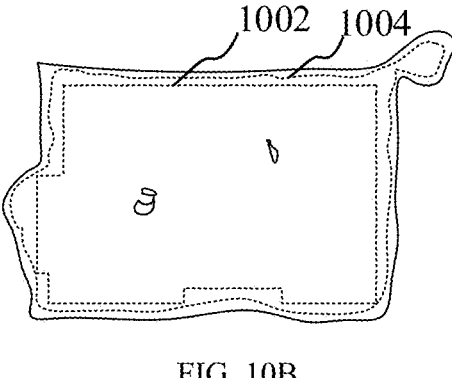
FIG. 10B is a schematic diagram illustrating a static edge path and a dynamic edge path in an embodiment.

In step 902, an initial map of an operation region is obtained. Exemplarily, the initial map of the operation region is a 2D grid map, as shown in FIG. 10A.

In step 904, the initial map is processed to obtain a static edge path. Exemplarily, the 2D grid map is binarized, and pixel values in the image are represented as 0 or 254, where 0 represents passable and 254 represents impassable, to obtain a first target image. A 3*3 kernel is set, and a second target image is obtained by performing an OR operation with the kernel and the first target image, and then a third target image is obtained by performing an AND operation with the 3*3 kernel and the second target image. Further, contour extraction is performed on the third target image, and the largest contour is determined to be a static edge path, as shown in 1002 in FIG. 10B.

In step 906, a cleaning operation is performed based on the static edge path, and dynamic sensing information is obtained in real time. Exemplarily, the sweeping robot performs the cleaning operation based on the static edge path. While performing the cleaning work, the sweeping robot dynamically obtains, information about surrounding obstacles, including walls, tables and chairs, etc., based on an auxiliary device such as a sensor and an infrared distance measurement instrument, and then obtains an obstacle coverage region and an edge of the obstacle. The obstacle coverage region and the edge of the obstacle are each represented by a two-dimensional coordinate point set.

In step 908, the static edge path is adjusted based on the dynamic sensing information, to obtain a dynamic edge path. Exemplarily, based on positioning information of the sweeping robot, coordinates of a geometric center of the sweeping robot are obtained, and a path point closest to the geometric center of the sweeping robot in the static edge path is determined as a first path point to be fitted. Starting from the first path point to be fitted, distances between two adjacent path points are calculated, respectively, and the calculated distances are accumulated, and then the path points contained in the accumulated distance that is equal to a preset distance are determined as a set of the path points to be fitted. A trinomial fitting is performed on the set of the path points to be fitted, and parameters are set using a nonlinear least squares method, and then the parameters of the trinomial fitting are obtained through a Newton-Gaussian iteration method to obtain the fitted curve. The fitted curve is sampled at a preset sampling distance to obtain fitted sampling points, and a tangential direction of each of the fitted sampling points is obtained by performing a derivation operation and an inverse tangent operation on the fitted curve. Distances from the fitted sampling points to the geometric center of the sweeping robot are calculated, respectively, and the sampling point with the shortest distance is determined as a target fitted sampling point. Further, distances from the edge points of the edge of the obstacle to the target fitted sampling point are calculated, respectively, and the edge point with the shortest distance is determined as a reference point, and then a longitudinal displacement of the reference point relative to the target fitted sampling point is calculated. If the longitudinal displacement is less than 0, a reference direction is 90°, and if the longitudinal displacement is greater than 0, the reference direction is −90°. Then the tangential direction of the fitted sampling point is added to the reference direction to obtain a moving direction of the fitted sampling point.

Each of the fitted sampling points is moved at least once based on the corresponding moving direction and a preset moving distance, to obtain a reference edge path point. Based on a coverage region of the sweeping robot and the reference path point, a pre-coverage region where the geometric center of the sweeping robot is located at the reference path point is obtained. Further, an intersection operation is performed on the pre-coverage region and the obstacle coverage region. If an intersection result is an empty set, each of the fitted sampling points continues to be moved based on the moving direction and the preset moving distance until the intersection result is not the empty set, then the reference path point obtained by previous movement is determined as the target path point. Further, the respective target path points are combined into a dynamic edge path, as shown in 1004 in FIG. 10B.

In step 910, the cleaning operation is performed based on the dynamic edge path. Exemplarily, the sweeping robot performs the cleaning operation based on the dynamic edge path shown in 1004 in FIG. 10B.

In this embodiment, the sweeping robot obtains the information about surrounding obstacles while operating, and adjusts the static edge path in real time based on the obstacle information, to obtain the dynamic edge path that is closer to the edge of the obstacle, thereby reducing operating blind spots and improving a cleaning effect for the edge of the obstacle.

It should be understood that although the individual steps in the flow diagrams of FIGS. 1 to 9 as described above are shown sequentially as indicated by arrows, the steps are not necessarily performed sequentially in the order indicated by the arrows. Unless explicitly stated herein, the execution of these steps is not strictly limited in order and these steps can be performed in any other order. Moreover, at least some of the steps in the flow diagrams of FIGS. 1 to 9 as described above may include a plurality of steps or a plurality of stages that are not necessarily performed at the same time, but may be performed at different times. The order in which these steps or stages are performed is not necessarily sequential, and these steps may be performed alternately or alternately with other steps or at least some of the steps or stages in other steps.

Based on the same inventive concept, embodiments of the present disclosure also provide a dynamic edge path generation apparatus for implementing the dynamic edge path generation method as described above. The solution to the problem provided by the apparatus is similar to the implementation of the method documented above, so the specific features in the one or more embodiments of the dynamic edge path generation apparatus provided below may be understood with reference to the features of the dynamic edge path generation method above and will not be repeated here.

Figure 11:
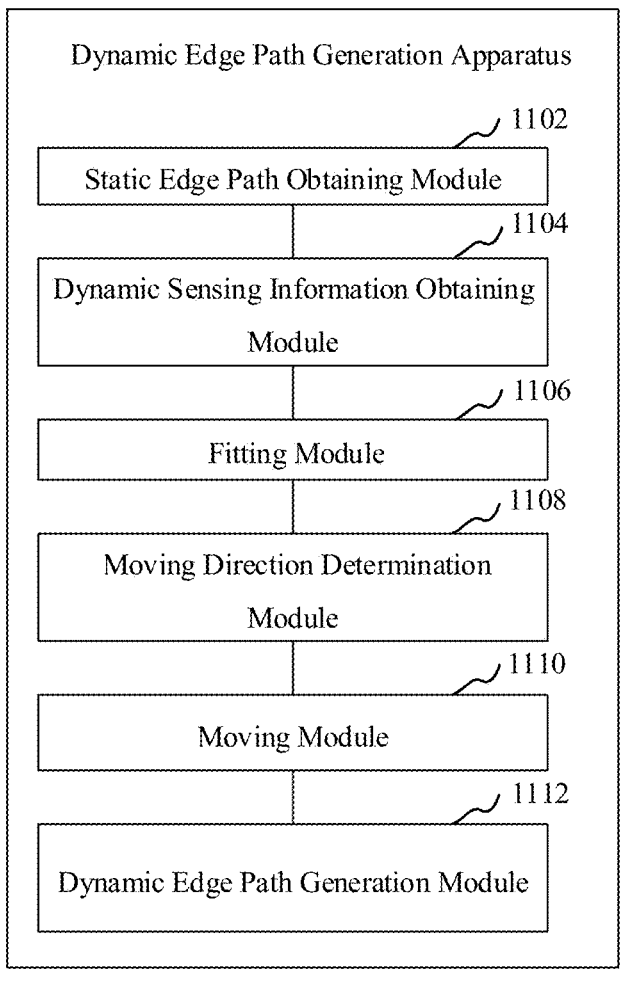
FIG. 11 is a block diagram illustrating a configuration of a dynamic edge path generation apparatus in an embodiment.

In an embodiment, as shown in FIG. 11, a dynamic edge path generation apparatus is provided. The dynamic edge path generation apparatus includes a static edge path obtaining module 1102, a dynamic sensing information obtaining module 1104, a fitting module 1106, a moving direction determination module 1108, a moving module 1110 and a dynamic edge path generation module 1112.

The static edge path obtaining module 1102 is configured to obtain a static edge path. The static edge path includes a plurality of path points.

The dynamic sensing information obtaining module 1104 is configured to obtain dynamic sensing information in real-time. The dynamic sensing information includes a position of a device and an edge of an obstacle.

The fitting module 1106 is configured to cut out, based on the position of the device, a path segment of a preset length from the static edge path, and fit the path points contained in the path segment to obtain a fitted curve.

The moving direction determination module 1108 is configured to determine, based on the fitted curve and the edge of the obstacle, moving directions respectively corresponding to fitted sampling points in the fitted curve.

The moving module 1110 is configured to move, based on the corresponding moving direction, each of the fitted sampling points by a preset distance at least once, to obtain target path points respectively corresponding to the fitted sampling points.

The dynamic edge path generation module 1112 is configured to obtain, based on the target path points, a dynamic edge path.

In an embodiment, the fitting module 1106 is further configured to: calculate a distance from each of the path points in the static edge path to the position of the device, and take the path point closest to the position of the device as a first path point to be fitted; calculate, based on the first path point to be fitted, distances between two adjacent path points, respectively, accumulate the distances to obtain a cumulative length, and take the path points contained in the cumulative length that is equal to the preset length as path points to be fitted; and perform a fitting calculation on the path points to be fitted to obtain a fitting parameter, and obtain, based on the fitting parameter, the fitted curve.

In an embodiment, the moving direction determination module 1108 is further configured to: sample the fitted curve at a preset sampling distance, to obtain a plurality of fitted sampling points; calculate a distance from each of the fitted sampling points to the position of the device, and take the fitted sampling point closest to the position of the device as a target fitted sampling point; obtain, from the edge of the obstacle, an edge point closest to the target fitted sampling point as a reference point; determine, based on a vertical direction of a tangent line of the target fitted sampling point in the fitted curve, a vertical displacement of the reference point relative to the target fitted sampling point; determine, based on the vertical displacement, a reference direction of a movement of each of the fitted sampling points; and determine, based on the reference direction and tangential directions of the fitted sampling points on the fitted curve, the moving directions respectively corresponding to the fitted sampling points.

In an embodiment, the moving direction determination module 1108 is further configured to: determine, if the vertical displacement is greater than zero, the reference direction of 90 degrees; and determine, if the vertical displacement is less than zero, the reference direction of negative 90 degrees.

In an embodiment, the moving direction determination module 1108 is further configured to: determine, based on the fitted curve, the tangential directions of the fitted sampling points on the fitted curve through a direction operation, respectively; and fuse the tangential directions of the fitted sampling points on the fitted curve with the reference direction, to obtain the moving directions respectively corresponding to the fitted sampling points.

In an embodiment, the moving module 1110 is further configured to: move, based on the corresponding moving direction, each of the fitted sampling points by the preset distance, to obtain a corresponding reference path point; and move, in a case that there is no overlapping region between a pre-coverage region of the reference path point and the obstacle coverage region, the reference path point based on the corresponding moving direction and the preset distance again until there is an overlapping region between the pre-coverage region of the corresponding reference path point and the obstacle coverage region, and take the corresponding reference path point obtained in previous movement as the corresponding target path point; the pre-coverage region of the reference path point being determined based on the reference path point and a coverage region of the device.

In an embodiment, the moving module 1110 is further configured to: obtain a size of the device; and obtain, based on the reference path point and the size, the pre-coverage region where a geometric center of the device is located at the reference path point.

In an embodiment, the moving module 1110 is further configured to: obtain the pre-coverage region of the reference path point, the pre-coverage region being represented by a two-dimensional coordinate point set; obtain the obstacle coverage region, the obstacle coverage region being represented by a two-dimensional coordinate point set; perform an intersection operation on the two-dimensional coordinate point set of the pre-coverage region and the two-dimensional coordinate point set of the obstacle coverage region, to obtain an intersection result; and determine, if the intersection result is an empty set, that the pre-coverage region does not overlap with the obstacle coverage region.

In an embodiment, the static edge path obtaining module 1102 is further configured to: obtain an initial map of an operation region; perform a dilation process and an erosion process on the initial map, to obtain a target image; and obtain, based on the target image, the static edge path.

The individual modules in the above dynamic edge path generation apparatus can be implemented in whole or in part by software, hardware and combinations thereof. Each of the above modules may be embedded in hardware form or independent of a processor in a computer device, or may be stored in software form on a memory in the computer device so that the processor can be called to perform the operations corresponding to each of the above modules.

In an embodiment, a computer device is provided, which may be the device 102 in FIG. 1. A diagram illustrating an internal configuration of the computer device may be shown in FIG. 12. The computer device includes a processor, a memory, an input/output interface, a communication interface, a display unit, and an input device. The processor, the memory and the input/output interface are connected via a system bus, and the communication interface is connected to the system bus via the input/output interface. The processor of the computer device is configured to provide computing and control capabilities. The memory of the computer device includes a non-transitory storage medium and an internal memory. The non-transitory storage medium stores operating systems and computer programs. The internal memory provides an environment for the operation of operating systems and computer programs in non-transitory storage medium. The input/output interface of the computer device is configured to exchange information between the processor and external devices. The communication interface of the computer device is configured to communicate with external terminals in wired or wireless mode, which can be realized by WIFI, mobile cellular network, near field communication (NFC) or other technologies. The computer programs are executed by the processor in order to implement a dynamic edge path generation method.

Figure 12:
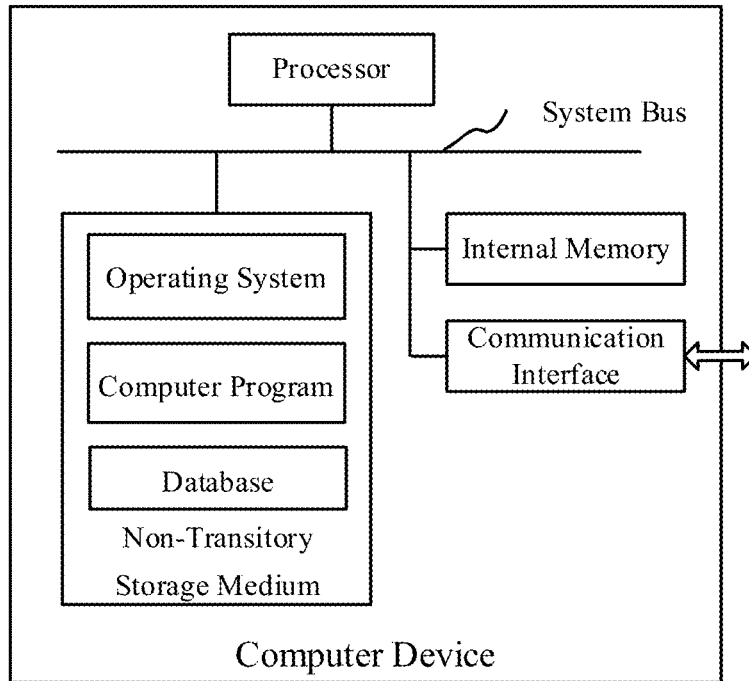
FIG. 12 is diagram illustrating an internal configuration of a device in an embodiment.

It should be understood by those skilled in the art that the configuration illustrated in FIG. 12, which is only a block diagram of part of the configuration related to the solution of the present disclosure, and does not constitute a limitation on the computer device to which the solution of the present disclosure is applied. Specifically, the computer device may include more or less components than those shown in the figure, or may combine some components, or may have a different arrangement of components.

In an embodiment, a computer device is further provided, including a processor and a memory having a computer program stored therein. The processor, when executing the computer program, implements steps of the above method embodiments.

In an embodiment, a computer-readable storage medium having a computer program stored therein is provided. When the computer program is executed by a processor, steps of the above method embodiments are implemented.

In an embodiment, a computer program product is provided, including a computer program. When the computer program is executed by a processor, steps of the above method embodiments are implemented.

It should be noted that the user information (including but not limited to user device information, user personal information, etc.) and data (including but not limited to data used for analysis, stored data, displayed data, etc.) involved in the present disclosure are information and data authorized by the user or fully authorized by all parties.

A person of ordinary skill in the art may understand that implementation of all or part of the processes in the methods of the above embodiments may be completed by instructing the relevant hardware through a computer program. The computer program may be stored in a non-transitory computer-readable storage medium. When the computer program is executed, it may include the processes of the embodiments of the above methods. Any reference to memory, database or other medium used of the embodiments provided in the present disclosure may include at least one of a non-transitory and a transitory memory. The non-transitory memory may include a read-only memory (ROM), a magnetic tape, a floppy disk, a flash memory, an optical memory, a high-density embedded non-transitory memory, a resistive random-access memory (ReRAM), a magneto resistive random-access memory (MRAM), a ferroelectric random-access memory (FRAM), a phase change memory (PCM), or a graphene memory, etc. The transitory memory may include a random-access memory (RAM) or an external cache memory, etc. As an illustration rather than a limitation, the random-access memory may be in various forms, such as a static random-access memory (SRAM) or a dynamic random-access memory (DRAM), etc. The databases involved of the embodiments provided by the present disclosure may include at least one of a relational database and a non-relational database. The non-relational database may include, but is not limited to, a blockchain-based distributed database, etc. The processor involved of the embodiments provided by the present disclosure may be, but is not limited to, a general purpose processor, a central processor, a graphics processor, a digital signal processor, a programmable logic device, a data processing logic device based on quantum computation, and the like.

The technical features in the above embodiments may be combined arbitrarily. For concise description, not all possible combinations of the technical features in the above embodiments are described. However, provided that they do not conflict with each other, all combinations of the technical features are to be considered to be within the scope described in this specification.

The above-mentioned embodiments only describe several implementations of the present disclosure, and their description is specific and detailed, but should not be understood as a limitation on the patent scope of the present disclosure. It should be noted that, for a person of ordinary skill in the art may further make variations and improvements without departing from the conception of the present disclosure, and these all fall within the protection scope of the present disclosure. Therefore, the protection scope of the present disclosure should be subject to the appended claims.

The invention claimed is:

1. A dynamic edge path generation method for controlling movement of a robot, comprising:

obtaining a static edge path from a server, the static edge path comprising a plurality of path points;

obtaining dynamic sensing information of the robot through an auxiliary device in real-time, the dynamic sensing information comprising a position of the robot and an edge of an obstacle;

cutting out, based on the position of the robot, a path segment of a preset length from the static edge path, and fitting the path points contained in the path segment to obtain a fitted curve;

determining, based on the fitted curve and the edge of the obstacle, moving directions respectively corresponding to fitted sampling points in the fitted curve;

moving, based on the corresponding moving direction, each of the fitted sampling points by a preset distance at least once, to obtain target path points respectively corresponding to the fitted sampling points; and obtaining, based on the target path points, a dynamic edge path, wherein the robot is controlled based on the dynamic edge path, and adjusting the static edge path in real time based on the obtained dynamic sensing information which avoids the obstacle and makes the obtained dynamic edge path fit the edge of the obstacle;

wherein the dynamic sensing information further comprises an obstacle coverage region, and moving, based on the corresponding moving direction, each of the fitted sampling points by the preset distance at least once, to obtain target path points respectively corresponding to the fitted sampling points, comprises:

moving, based on the corresponding moving direction, each of the fitted sampling points by the preset distance, to obtain a corresponding reference path point; and moving, in a case that there is no overlapping region between a pre-coverage region of the reference path point and the obstacle coverage region, the reference path point based on the corresponding moving direction and the preset distance again until there is an overlapping region between the pre-coverage region of the corresponding reference path point and the obstacle coverage region, and taking the corresponding reference path point obtained in previous movement as the corresponding target path point, the pre-coverage region of the reference path point being determined based on the reference path point and a coverage region of the robot.

2. The method according to claim 1, wherein cutting out, based on the position of the robot, the path segment of the preset length from the static edge path, and fitting the path points contained in the path segment to obtain the fitted curve, comprises:

calculating a distance from each of the path points in the static edge path to the position of the robot, and taking the path point closest to the position of the robot as a first path point to be fitted;

calculating, based on the first path point to be fitted, distances between two adjacent path points, respectively, accumulating the distances to obtain a cumulative length, and taking the path points contained in the cumulative length that is equal to the preset length as path points to be fitted; and performing a fitting calculation on the path points to be fitted to obtain a fitting parameter, and obtaining, based on the fitting parameter, the fitted curve.

3. The method according to claim 1, wherein determining, based on the fitted curve and the edge of the obstacle, the moving directions respectively corresponding to the fitted sampling points in the fitted curve, comprises:

sampling the fitted curve at a preset sampling distance, to obtain a plurality of fitted sampling points;

calculating a distance from each of the fitted sampling points to the position of the robot, and taking the fitted sampling point closest to the position of the robot as a target fitted sampling point;

obtaining, from the edge of the obstacle, an edge point closest to the target fitted sampling point as a reference point;

determining, based on a vertical direction of a tangent line of the target fitted sampling point in the fitted curve, a vertical displacement of the reference point relative to the target fitted sampling point;

determining, based on the vertical displacement, a reference direction of a movement of each of the fitted sampling points; and determining, based on the reference direction and tangential directions of the fitted sampling points on the fitted curve, the moving directions respectively corresponding to the fitted sampling points.

4. The method according to claim 3, wherein determining, based on the vertical displacement, the reference direction of the movement of each of the fitted sampling points, comprises:

determining, if the vertical displacement is greater than zero, the reference direction of 90 degrees; and determining, if the vertical displacement is less than zero, the reference direction of negative 90 degrees.

5. The method according to claim 3, wherein determining, based on the reference direction and the tangential direction of each of the fitted sampling points on the fitted curve, the moving directions respectively corresponding to the fitted sampling points, comprises:

determining, based on the fitted curve, the tangential directions of the fitted sampling points on the fitted curve through a direction operation, respectively; and fusing the tangential directions of the fitted sampling points on the fitted curve with the reference direction, to obtain the moving directions respectively corresponding to the fitted sampling points.

6. The method according to claim 1, further comprising: obtaining a size of the robot; and obtaining, based on the reference path point and the size, the pre-coverage region where a geometric center of the robot is located at the reference path point.

7. The method according to claim 1, wherein in the case that there is no overlapping region between the pre-coverage region of the reference path point and the obstacle coverage region, the method comprises:

obtaining the pre-coverage region of the reference path point, the pre-coverage region being represented by a two-dimensional coordinate point set;

obtaining the obstacle coverage region, the obstacle coverage region being represented by a two-dimensional coordinate point set;

performing an intersection operation on the two-dimensional coordinate point set of the pre-coverage region and the two-dimensional coordinate point set of the obstacle coverage region, to obtain an intersection result; and determining, if the intersection result is an empty set, that the pre-coverage region does not overlap with the obstacle coverage region.

8. The method according to claim 1, wherein obtaining the static edge path comprises:

obtaining an initial map of an operation region;

performing a dilation process and an erosion process on the initial map, to obtain a target image; and obtaining, based on the target image, the static edge path.

9. A computer device comprising a processor and a memory having a computer program stored therein, wherein the computer device is a robot, wherein the processor, when executing the computer program, implements:

obtaining a static edge path from a server, the static edge path comprising a plurality of path points;

obtaining dynamic sensing information of the robot through an auxiliary device in real-time, the dynamic sensing information comprising a position of the robot and an edge of an obstacle;

cutting out, based on the position of the robot, a path segment of a preset length from the static edge path, and fitting the path points contained in the path segment to obtain a fitted curve;

determining, based on the fitted curve and the edge of the obstacle, moving directions respectively corresponding to fitted sampling points in the fitted curve;

moving, based on the corresponding moving direction, each of the fitted sampling points by a preset distance at least once, to obtain target path points respectively corresponding to the fitted sampling points; and obtaining, based on the target path points, a dynamic edge path, wherein the robot is controlled based on the dynamic edge path, and adjusting the static edge path in real time based on the obtained dynamic sensing information which avoids the obstacle and makes the obtained dynamic edge path fit the edge of the obstacle;

wherein the processor, when executing the computer program, further implements:

moving, based on the corresponding moving direction, each of the fitted sampling points by the preset distance, to obtain a corresponding reference path point; and moving, in a case that there is no overlapping region between a pre-coverage region of the reference path point and the obstacle coverage region, the reference path point based on the corresponding moving direction and the preset distance again until there is an overlapping region between the pre-coverage region of the corresponding reference path point and the obstacle coverage region, and taking the corresponding reference path point obtained in previous movement as the corresponding target path point, the pre-coverage region of the reference path point being determined based on the reference path point and a coverage region of the robot.

10. A non-transitory computer-readable storage medium having a computer program stored therein, wherein the non-transitory computer-readable storage medium implemented into a robot, wherein the computer program, when executed by a processor, causes the processor to:

obtain a static edge path from a server, the static edge path comprising a plurality of path points;

obtain dynamic sensing information of the robot through an auxiliary device in real-time, the dynamic sensing information comprising a position of the robot and an edge of an obstacle;

cut out, based on the position of the robot, a path segment of a preset length from the static edge path, and fit the path points contained in the path segment to obtain a fitted curve;

determine, based on the fitted curve and the edge of the obstacle, moving directions respectively corresponding to fitted sampling points in the fitted curve;

move, based on the corresponding moving direction, each of the fitted sampling points by a preset distance at least once, to obtain target path points respectively corresponding to the fitted sampling points; and obtain, based on the target path points, a dynamic edge path, wherein the robot is controlled based on the dynamic edge path, and adjusting the static edge path in real time based on the obtained dynamic sensing information which avoids the obstacle and makes the obtained dynamic edge path fit the edge of the obstacle;

wherein the computer program, when executed by a processor, further causes the processor to:

move, based on the corresponding moving direction, each of the fitted sampling points by the preset distance, to obtain a corresponding reference path point; and move, in a case that there is no overlapping region between a pre-coverage region of the reference path point and the obstacle coverage region, the reference path point based on the corresponding moving direction and the preset distance again until there is an overlapping region between the pre-coverage region of the corresponding reference path point and the obstacle coverage region, and taking the corresponding reference path point obtained in previous movement as the corresponding target path point, the pre-coverage region of the reference path point being determined based on the reference path point and a coverage region of the robot.

11. The computer device according to 9, wherein the processor, when executing the computer program, further implements:

calculating a distance from each of the path points in the static edge path to the position of the robot, and taking the path point closest to the position of the robot as a first path point to be fitted;

calculating, based on the first path point to be fitted, distances between two adjacent path points, respectively, accumulating the distances to obtain a cumulative length, and taking the path points contained in the cumulative length that is equal to the preset length as path points to be fitted; and performing a fitting calculation on the path points to be fitted to obtain a fitting parameter, and obtaining, based on the fitting parameter, the fitted curve.

12. The computer device according to 9, wherein the processor, when executing the computer program, further implements:

sampling the fitted curve at a preset sampling distance, to obtain a plurality of fitted sampling points;

calculating a distance from each of the fitted sampling points to the position of the robot, and taking the fitted sampling point closest to the position of the robot as a target fitted sampling point;

obtaining, from the edge of the obstacle, an edge point closest to the target fitted sampling point as a reference point;

determining, based on a vertical direction of a tangent line of the target fitted sampling point in the fitted curve, a vertical displacement of the reference point relative to the target fitted sampling point;

determining, based on the vertical displacement, a reference direction of a movement of each of the fitted sampling points; and determining, based on the reference direction and tangential directions of the fitted sampling points on the fitted curve, the moving directions respectively corresponding to the fitted sampling points.

13. The computer device according to claim 12, wherein the processor, when executing the computer program, further implements:

determining, if the vertical displacement is greater than zero, the reference direction of 90 degrees; and determining, if the vertical displacement is less than zero, the reference direction of negative 90 degrees.

14. The computer device according to claim 12, wherein the processor, when executing the computer program, further implements:

determining, based on the fitted curve, the tangential directions of the fitted sampling points on the fitted curve through a direction operation, respectively; and fusing the tangential directions of the fitted sampling points on the fitted curve with the reference direction, to obtain the moving directions respectively corresponding to the fitted sampling points.

15. The computer device according to 9, wherein the processor, when executing the computer program, further implements:

obtaining a size of the robot; and obtaining, based on the reference path point and the size, the pre-coverage region where a geometric center of the robot is located at the reference path point.

16. The computer device according to claim 9, wherein the processor, when executing the computer program, further implements:

obtaining the pre-coverage region of the reference path point, the pre-coverage region being represented by a two-dimensional coordinate point set;

obtaining the obstacle coverage region, the obstacle coverage region being represented by a two-dimensional coordinate point set;

performing an intersection operation on the two-dimensional coordinate point set of the pre-coverage region and the two-dimensional coordinate point set of the obstacle coverage region, to obtain an intersection result; and determining, if the intersection result is an empty set, that the pre-coverage region does not overlap with the obstacle coverage region.

17. The computer device according to claim 9, wherein the processor, when executing the computer program, further implements:

obtaining an initial map of an operation region;

performing a dilation process and an erosion process on the initial map, to obtain a target image; and obtaining, based on the target image, the static edge path.

18. The non-transitory computer-readable storage medium according to claim 10, wherein the computer program, when executed by a processor, further causes the processor to:

calculate a distance from each of the path points in the static edge path to the position of the robot, and take the path point closest to the position of the robot as a first path point to be fitted;

calculate, based on the first path point to be fitted, distances between two adjacent path points, respectively, accumulate the distances to obtain a cumulative length, and take the path points contained in the cumulative length that is equal to the preset length as path points to be fitted; and perform a fitting calculation on the path points to be fitted to obtain a fitting parameter, and obtain, based on the fitting parameter, the fitted curve.

* * * * *